United States Patent [19]

Hicks et al.

[11] 3,876,114
[45] Apr. 8, 1975

[54] MULTIPLE INGREDIENT METERING, MIXING AND DISPENSING APPARATUS

[75] Inventors: Prentiss C. Hicks; Fred C. Turrentine, both of Portland, Oreg.

[73] Assignee: Artek Industries, Inc., Portland, Oreg.

[22] Filed: Feb. 14, 1973

[21] Appl. No.: 332,345

[52] U.S. Cl. .............. 222/148; 222/145; 239/112
[51] Int. Cl. ............................................ B67d 5/56
[58] Field of Search .......... 222/145, 148; 137/240; 239/112; 134/95, 102, 104, 117

[56] References Cited
UNITED STATES PATENTS

| | | | |
|---|---|---|---|
| 3,049,267 | 8/1962 | Edwards et al. | 222/148 X |
| 3,146,950 | 9/1964 | Lancaster | 239/112 X |
| 3,212,676 | 10/1965 | Trumbull et al. | 222/148 X |
| 3,443,578 | 5/1969 | Hedin | 137/240 |
| 3,462,081 | 8/1969 | Gelin et al. | 239/112 X |

*Primary Examiner*—Robert B. Reeves
*Assistant Examiner*—Larry H. Martin
*Attorney, Agent, or Firm*—Klarquist, Sparkman, Campbell, Leigh, Hall & Whinston

[57] ABSTRACT

The dispensing apparatus is especially adapted for metering, mixing and dispensing small "shots" of synthetic resin material in liquid form with a minute percentage of a liquid catalyst for patching defects in wood panels. A hand-held dispensing gun of the apparatus has a static mix tube extending from a mixing chamber in a dispensing head where a single air-operated piston upon trigger actuation simultaneously opens resin and catalyst infeed ports to the mixing chamber. At the same time, trigger actuation connects a control air line from a source of compressed air to a pilot air line to start an air motor which drives resin and catalyst metering pumps. These pumps are driven from a common drive shaft with an adjustable mechanical linkage for adjusting the catalyst-resin metering ratio. The pumps meter resin and catalyst through separate lines to the mix chamber of the dispensing gun. A thermostatically controlled heater preheats the resin as it flows to the dispensing gun. An air-powered flush system selectively flushes the mixing chamber and mix tube with an atomized solvent to prevent setup of resin in these parts. A combined electrical-air operated flush-warning system with an automatic trigger-actuated reset reminds the operator to flush the system when the gun is not used to dispense material for a prolonged period.

7 Claims, 3 Drawing Figures

MULTIPLE INGREDIENT METERING, MIXING AND DISPENSING APPARATUS

BACKGROUND OF THE INVENTION

1. Field of the Invention

The present invention relates to an apparatus for metering, mixing and dispensing large or small quantities of a synthetic liquid filling or casting resin and a small percentage of a liquid catalyst to begin solidifcation of the resin upon dispensing.

2. Desciption of the Prior Art

Equipment for dispensing single component synthetic liquid resins with a small percentage of catalyst is not new. However, equipment of this nature versatile enough to meter, mix and dispense accurately carefully controlled quantities of such liquid resin material in sufficiently small shots for filling voids in plywood panels while maintaining the desired ½% to 2% catalyst ratio constant has been commercially unavailable.

Existing equipment for patching wood panels with a synthetic filler is designed to dispense a two-part polymer and is extremely costly and unreliable. Such equipment is not geared for dispensing a one-component resin with the requisite small percentage of catalyst.

A further disadvantage of prior synthetic resin-dispensing equipment is that most have solvent-flushing systems which require large quantities of solvent to clean the internal passages of the system.

Another shortcoming of existing equipment is its lack of any adequate warning system to signal the operator when the equipment should be flushed or used to prevent set-up of the resin-catalyst mix within the equipment.

SUMMARY OF THE INVENTION

In accordance with the invention, a synthetic liquid and catalyst metering, mixing and dispensing apparatus suitable for patching wood panels is provided which eliminates or materially reduces the foregoing shortcomings of existing equipment.

Primary features of the invention include:

1. A trigger-operated air control system which controls simultaneously on demand (a) the opening and closing of two liquid component (e.g., resin and catalyst) valve ports in the dispensing head for mixing the components, (b) the starting and stopping of an air motor which drives both resin and catalyst-metering pumps, and (c) the resetting of a flush-warning timer;

2. An air pressure-operated flush system with a single valve control for introducing a small charge of solvent followed by a high-pressure air blast into a flush line to propel the charge to a mixing chamber in the dispensing gun and there atomize the solvent charge before forcing the charge through the mix tube of the gun to clean and dry these parts of the apparatus, thereby minimizing both the amount of solvent and the operator time required to flush the system;

3. A flush-warning system which automatically signals the operator when the mixing and dispensing components of the apparatus should be flushed and which automatically resets itself each time the dispensing apparatus is used;

4. A catalyst priming system which includes (a) means for purging the catalyst pump and lines of entrapped gases and impurities before pump start-up using a gravity siphoning system including a catalyst supply positioned above the catalyst pump and a catalyst dump container at the outlet side of the pump below the catalyst supply and a catalyst purge valve in a catalyst line leading to the catalyst dump, and (b) a catalyst pressurizing means whereby the catalyst lines are pressurized through actuation of a single priming lever that simultaneously rotates a valve in the resin line to allow the resin to recirculate through the resin pump infeed and starts the air motor to drive the catalyst and resin pumps without dispensing any material;

5. A dispensing head incorporating a single air-actuated piston which controls valve means for simultaneously opening and closing resin and catalyst infeed ports into a mixing chamber, with the head further incorporating a solvent port into the mixing chamber normally closed by a flush line pressure-operated check valve, and a catalyst flow regulator;

6. A catalyst and resin-metering pump drive, which includes a single air motor driving both a gear pump for metering resin and a double-acting piston pump for metering catalyst through a common drive shaft and an adjustable mechanical linkage between the drive shaft and the piston pump to control the stroke of the piston and thus the ratio of catalyst to resin metered to the dispensing gun; and 7. A unique catalyst-metering pump capable of metering in a precise, substantially constant flow extremely small amounts of catalyst without the use of an accumulator through a unique arrangement of passages and check valves in the pump body.

Principle objects of the invention are to provide:

1. A two-component liquid-dispensing apparatus of simplified design and operation;

2. A two-component liquid-dispensing apparatus capable of dispensing on demand a wide range of precisely controlled quantities of liquid material including very small quantities for filling small voids in wood panels;

3. A two-component liquid-dispensing apparatus capable of metering, mixing and dispensing in small, precisely controlled portions a synthetic liquid resin mixed with a very small but accurately controlled proportion of a liquid catalyst;

4. A liquid-dispensing apparatus having a flush system capable of flushing the apparatus' mixing and dispensing components in a minimum time with a small charge of solvent; and 5. Apparatus as aforesaid including a flush-warning system for warning the operator when the dispensing mechanism should be either flushed or operated.

The foregoing and other objects, features and advantages of the present invention will become more apparent from the following detailed description, which proceeds with reference to the accompanying drawings.

BRIEF DESCRIPTION OF THE DRAWINGS In the drawings.

DETAILED DESCRIPTION

General Arrangement

The present invention will be described with reference to a dispensing apparatus specifically designed for dispensing in small portions a mixture of a single component liuid synthetic resin such as polyester with a very minute proportion of liquid catalyst. Thus many of the components of the apparatus shown and described are especially designed for metering, mixing and dispensing very small quantities of accurately proportioned material. Such components include the resin and catalyst-metering pumps, the metering pump drive, and the dispensing head. The illustrated apparatus is specifically designed for use in patching plywood or other wood panels with a synthetic polyester resin patching material sold commercially by Artek Industries, Inc., of Portland, Ore., under the trademark "Plypatch," which is formulated as a flexible, fast resin having an initial set-up or gel time of approximately 90 seconds at 77°F. when mixed with 2% catalyst of MEK peroxide.

It is to be understood, however, that the same basic apparatus could be used to dispense polyester resins for other purposes such as for filling molds. This change in end use would require only a change in the basic size of the components used. However, if the machine were to be adapted for use in dispensing liquids other than a single-component resin with a catalyst, such as a two-component synthetic liquid polymer, then other, more substantial modifications would have to be made in some of the individual components of the system to adapt the same to the pecularities of the materials used. Nevertheless basic components of the present system, such as the dispensing gun, control system, flush system, flush-warning system and metering pump drive might still have application.

Figures 1, 2:
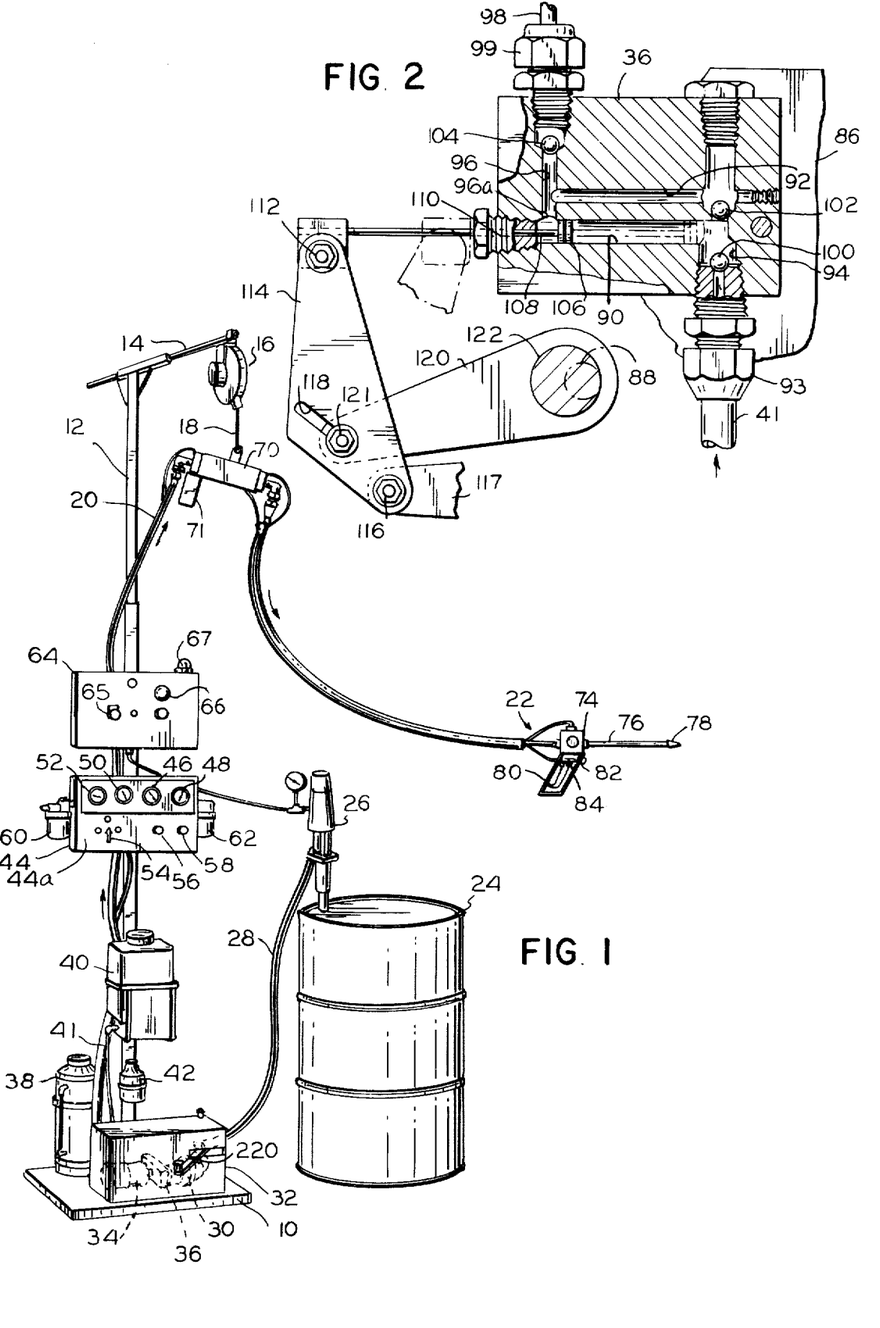
FIG. 1 is a perspective view of a dispensing apparatus in accordance with the invention.
FIG. 2 is a sectional view through a portion of the catalyst metering pump drive mechanism of the invention.

The apparatus of FIG. 1 includes a base 10 which may be optionally mounted on casters or wheels for mobility, an extensible mast 12 extending upwardly from the base and a generally horizontally extending, telescopically extensible boom 14 mounted to the upper end of the mast. The outer end of the mast carries a spring-retractable cable housing 16 from which a suspension cable 18 extends to support in an elevated position an intermediate section of a group of flexible hoses 20 which carry the various fluids of the apparatus to a dispensing gun, shown generally at 22.

A drum 24 beside base 10 contains a source of resin. An air-driven piston-actuated drum pump 26 extending into the top of the drum pumps from the drum through a resin feed line 28 to the inlet side of the resin-metering pump 30 mounted on base 10 within a pump and motor housing 32. A diaphragm flow regulator 29 (FIG. 3) in line 28 smooths out the flow of resin from the drum to the pump. An air motor 34 within the housing drives both the resin-metering pump 30 and a catalyst-metering pump 36 from a common drive shaft 88 illustrated schematically in FIG. 3 and to some extend in FIG. 2.

A container 38 on the base provides a source of suitable solvent for flushing the mixing and dispensing components of the apparatus. One of the hoses 20 is a solvent hose leading from the solvent supply to the dispensing gun. Mounted on a lower portion of the mast 12 is a catalyst supply bottle 40 having a suitable supply line 41 leading from a lower portion of the bottle down to the inlet side of the catalyst-metering pump 36 for providing a gravity feed of catalyst to the inlet side of the pump. Mounted just below the catalyst supply bottle 40 is a catalyst dump bottle 42, the purpose of which will be explained later.

Figure 3:
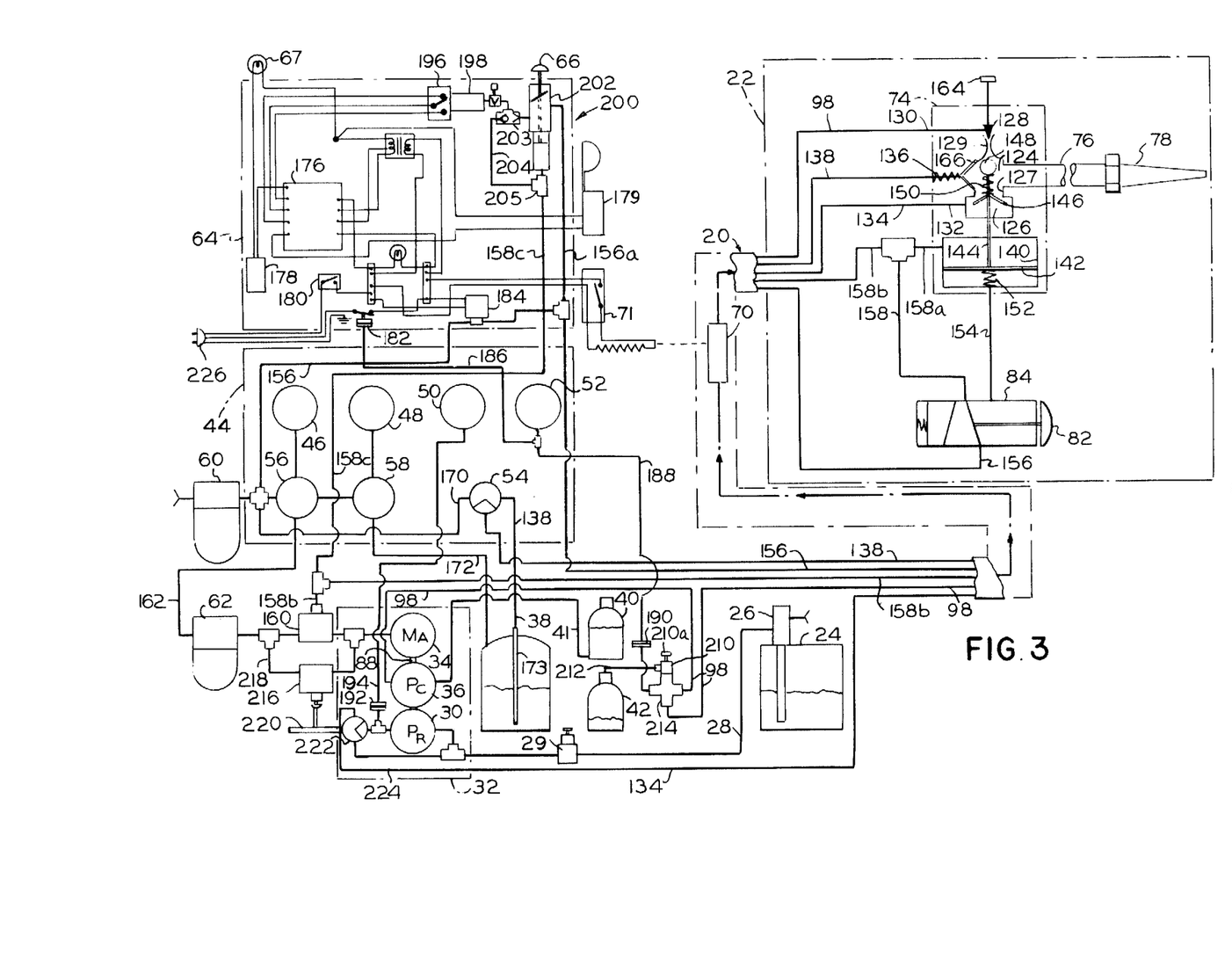
FIG. 3 is a circuit diagram showing the air, liquid and electrical circuits of the invention.

Moving upwardly along the mast, just above the catalyst source 40 is a control box 44 including a control panel 44a with the dials of various control gauges being visible on the control panel face including an air motor volume gauge 46, a solvent pressure gauge 48, a resin pressure gauge 50 and a catalyst pressure gauge 52. The gauges will also be found in the schematic diagram of FIG. 3. A three-way flush control valve 54 is also provided on the panel face. Its operation will be explained in connection with the later discussion of the overall flush system. The two dial controls 56, 58 are for setting the air motor regulator and solvent pressure regulator, respectively, housed within the control panel as shown in FIG. 3. An air filter 60 on one side of the panel filters all air entering the system from the air pressure source (not shown). An oiler 62 on the opposite side of the panel is in a line through which air leading to the air motor must pass.

A flush-warning module 64 is mounted on the mast just above control panel 44. Visible on the face of the module is a timer setting dial 65 and a timer manual reset button 66. A warning light 67 which flashes when energized is visible along the top of the flush-warning module. A warning bell 179 is housed within the module together with an electric timer, timer circuitry and air-operated timer reset means, all shown in FIG. 3.

A resin-heating unit 70 is positioned midway along the length of the hoses 20 leading to the dispensing gun. This heating unit includes an aluminum block with a hollow central core into which a heating element is placed and heated through the heating control unit 71. The block contains a plurality of parallel longitudinal passages in surrounding relationship to the hollow core. The passages are interconnected at the opposite ends of the block in a manner such that all resin flowing toward the dispensing gun passes through all of the passages sequentially within the block to preheat the resin before it reaches the gun.

The dispensing gun 22 includes a generally rectangular dispensing head 74 and a static mix tube 76 projecting from the head with a distribution nozzle 78 at its outer end. A grip 80 depends from the head and mounts a trigger actuator 82 and an air control valve 84 operated by the trigger.

Operation and control of the apparatus described is achieved essentially through the use of compressed air. Air pressure is used to drive the drum pump 26 to supply resin to the resin-metering pump. Air is used to drive the air motor 34 which in turn drives both the resin and catalyst metering pumps. The control of air to the air motor is provided by an air-operated pilot valve controlled by actuation of the trigger 82 on the dispensing gun. The opening and closing of resin and catalyst infeed ports to a mixing chamber within the dispensing head 74 is effected by an air-operated piston controlled by trigger 82. Similarly, the solvent flush system is air-operated, both as to the forcing of solvent from bottle 40 into a solvent passage leading to the dispending head and to the propelling of the solvent to the dispensing head. Finally, even the flush-warning system includes an air-actuated reset mechanism operated either automatically through actuation of the trigger 82 of the dispensing gun or manually by the reset button on the warning module.

Catalyst-Metering Pump and Metering Pump Drive

Referring to FIG. 2, the catalyst-metering pump 36 comprises a thin stainless steel block mounted on a bracket 86 over a drive shaft 88 leading from the air motor 34 directly to the gear pump, 30 which meters the resin. Pump 36 includes a cylindrical horizontal piston bore 90 extending into the block from a sealed opening at one end, a smaller bore 92 above and parallel to the piston bore, and a catalyst inlet passage 94 leading into the block from a bottom opening and connected to the catalyst feed line 41 by a suitable coupling 93. Inlet passage 94 is in communication with both the inner end of the piston bore 90 and with the smaller parallel bore 92. A vertically extending outlet passage 96 extends upwardly from communication with the outer ends of both piston bore 90 and parallel bore 92. The outlet passage is connected to a catalyst supply line 98 at a coupling 99.

The internal pump passages include a first ball check valve 100 at the entrance of the inlet passage 94 to the block upstream of the piston bore, a second ball check valve 102 in passage 94 between the piston bore 90 and the upper parallel bore 92, and a third ball check valve 104 in the outlet passage 96 downstream of both bores.

A piston 106 is reciprocated within piston bore 90 by a piston rod 108 extending outwardly from the pump block through a suitable seal at 110. The outer end of the piston rod is pivotably connected at 112 to the upper end of a bell crank lever 114, the lower end of which is pivoted at 116 to a stationary support 117, which may be a suitable extension of pump-mounting bracket 86. The intermediate pivot point of the bell crank lever is adjustable and includes a slot 118 along which the outer end of the cam arm 120 is adjustably and pivotally connected at 121. The inner end of the cam arm is carried by a cam 122 on drive shaft 88 leading from the air motor. Thus rotation of the drive shaft 88 induces a reciprocation in cam arm 120 which in turn transmits a rocking motion to bell crank lever 114 about pivot point 116 to cause a horizontal reciprocating movement of piston rod 108 and thus piston 106 within the piston bore 90 of pump 36. The stroke of the piston can, of course, be varied simply by changing the position of the pivotal connection 121 in slot 118, with the upper portion of the slot representing the shorter piston strokes and the lower portion of the arm the longer piston strokes.

In the operation of the catalyst pump, a retraction of the piston within bore 90 draws catalyst into the piston bore 90 from supply line 41 and through ball check valve 94. Extension of the piston 106 forces the catalyst in bore 90 up through ball check valve 102 into parallel bore 92 and out through outlet passage 96 to the catalyst supply hose 98 leading to the dispensing gun. However, since the piston rod displaces one-half the capacity of bore 90, extension of piston 106 forces one-half of the catalyst ahead of the piston to return to the piston bore behind the piston through a lower portion 96a of passage 96. Thus on the return stroke of piston 106 toward its retracted position, the piston forces catalyst which has filled in the piston bore behind it up through outlet passages 96a and 96 to the catalyst supply line 98, while at the same time drawing additional catalyst into bore 90 from the inlet passage. Thus piston 106 is double-acting, forcing catalyst from the piston bore to the pump outlet during both its retraction and extension, thereby inducing a substantially constant flow of catalyst through supply line 98 to the dispensing head.

Dispensing Gun

Referring to FIGS. 1 and 3, dispensing head 74 is a generally rectangular, aluminum block with a longitudinally extending interior cavity defining a mixing chamber 124, a resin infeed chamber 126, a catalyst infeed chamber 128, a resin infeed port 127 connecting the resin chamber to the mixing chamber, and a catalyst infeed port 129 connecting the catalyst chamber to the mixing chamber.

A catalyst passage 130 extends into the dispensing head and to an outlet at catalyst chamber 128 from a connection with the flexible line portion of catalyst passage 98 from the catalyst pump. Similarly, a resin passage 132 extends into the head and to an outlet at the resin chamber 126 a connection with a flexible line portion of a resin passage 134 leading from the outlet side of resin pump 30. In addition, a solvent passage 136 extends into the head and into direct communication with the mixing chamber 124 from its connection with a flexible line portion of a solvent passage 138 from solvent source 38.

The dispensing head also had a piston cavity 140 within which a single piston 142 is housed. The piston cavity is in axial alignment with the resin port, mixing chamber and catalyst port. The piston has a piston rod 144 which extends through the resin chamber and into the mixing chamber. An enlarged land portion 146 of the piston rod within the mixing chamber serves as a movable valve member which is adapted to seat firmly within the resin port 127 and thus close such port when the piston is urged in a direction toward the mixing chamber, or upwardly in FIG. 3. Thus the piston rod serves as a spool valve.

An extension of the piston rod 144 beyond land 146 into the mixing chamber engages a movable ball valve member 148 held in alignment with and in proximity to the catalyst bore 129 by a small compression spring 150. When the piston is urged toward the mixing chamber, or upwardly in FIG. 3, the distal end of the piston rod engages ball valve member 148 and holds it in sealing engagement against catalyst port 129 to close such port.

Conversely, retraction of piston 142 and thus the piston rod in a direction away from the mixing chamber releases the ball from engagement with the rod and simultaneously withdraws the land 146 from the resin port, thereby permitting resin and catalyst under pressure to flow simultaneously through their respective ports into the mixing chamber.

Piston 142 and its connected piston rod are normally held in their port-closing positions by a compression spring 152 in the piston cavity and by air pressure on the spring side of the piston. Air is admitted to the piston cavity through a line 154 whch communicates with a control air line 156 through the air control means 84 when trigger 82 is in its relaxed position (not shown). The control line 156 is in direct communication with the air pressure supply.

When trigger 82 is depressed as shown in FIG. 3, the air control valve 84 connects control air line 156 with a pilot air line 158. One branch passage 158a of the pilot line leads into the dispensing head and to the piston cavity on the side of piston 142 opposite compression spring 152, thereby retracting the piston and its rod to open the resin and catalyst inlet ports.

The other branch 158b of the pilot air line 158 is a flexible air hose leading to a normally closed pilot air valve 160. This valve controls the admissin of air to motor 34 through an air motor supply line 162 leading through air regulator 56 from the air supply.

The dispensing head also includes a catalyst flow regulator 164 which comprises a manually adjustable needle valve defining a variable orifice between the catalyst infeed chamber and the catalyst port to control the pressure and thus the flow rate of catalyst through the port when the ball valve is open. The flow regulator is set to dampen surges and pulsations in the flow of catalyst to the mixing chamber to ensure an accurate ratio of catalyst to resin in such chamber.

Mix chamber 124 is in direct communication with mix tube 76 through a suitable outlet passage from the chamber through the head. Mix tube 76 is a static mix tube, that is, one that inherently causes a thorough mixing of the catalyst and resin as they are forced out through the tube because of the design configuration of the interior surfaces of the tube. A suitable mix tube for this purpose is manufactured by Kenics Corporation of Danvers, Mass., under U.S. Pat. No. 3,280,982.

The solvent passage 136 in the dispensing head contains a normally closed check valve 166 at its outlet to the mixing chamber to prevent the backflow of resin and catalyst into the solvent passage. The solvent check valve 166 opens under a suitable upstream line pressure in solvent passage 138 to admit solvent into the mixing chamber during a flushing cycle, as initiated by operation of valve 54.

From the foregoing description, it will be apparent that by pressing trigger 82, control air from the control air line 156 is admitted to the various pilot air lines, thereby simultaneously (1) retracting dispenser piston 142 to open simultaneously the resin and catalyst ports in the dispensing head, and (2) actuating pilot air valve 160 through pilot air line 158b to open the primary air motor supply line 162 to start the air motor 34. The air motor in turn drives both the catalyst-metering pump 36 and the resin-metering pump 30 to supply resin and catalyst in a preset ratio to the mixing chamber, from where it is forced through mix tube 76 and nozzle 78 to the work.

Power Flush System

The intermixed resin and catalyst in the mix chamber and mix tube of the dispensing gun will set up in such parts if permitted to remain there beyond the catalyzed resin's pot life. Therefore means are provided for flushing the mix chamber and mix tube when desired. A solvent such as acetone or methylene chloride is used for this purpose. The solvent is transmitted from supply 38 to the mixing chamber through the solvent supply line 138 and solvent passage 136 in the dispensing head. The three-position flush valve 54 is provided in the solvent line 138 at its intersection with an air passage 170 connected directly to the high pressure air source. Another air passage 172 connected to the air pressure source leads through solvent pressure regulator 58 to an upper end of the solvent supply container 38 to force solvent up through solvent discharge tube 173 into a first section of solvent passage 138 leading to flush control valve 54.

When valve 54 is in its position shown in FIG. 3, it blocks flow of both compressed air and solvent into the section of solvent passage 138 downstream of the valve leading to the dispensing gun. However, when the flush valve is turned to a second position, which will be evident from FIG. 3, a charge of solvent is permitted to pass from the section of line 138 on the inlet side of the valve to the section of line 138 on the outlet side of the valve leading to the dispensing gun. Preferably the flush valve is permitted to remain in this second position for only a brief moment so that only a very small charge of solvent, about a teaspoonful, passes into the downstream section of line 138. Then the valve is turned to a third position which opens the downstream section of solvent line 138 to communication with high pressure air line 170. The resultant blast of air accelerates the solvent charge to a high velocity in pushing it through line 138 and solvent passage 136 of the dispensing head and past solvent check valve 166 into the mix chamber, where the air helps atomize the expanding solvent charge. A relatively long blast of air is used so that the atomized solvent charge scrubs the mix chamber and mix tube 76 as it is propelled from the gun. The air blast is continued until the solvent is completely purged from the mix chamber and mix tube and these parts thoroughly dried.

Flush valve 54 should be placed in line 138 at a position remote from the mix chamber so that the air blast has a chance to accelerate the solvent charge to a high velocity before it enters the chamber. If the solvent does not enter the chamber at high velocity, its atomization and scrubbing effect is greatly reduced or nonexistent. In practice it has been found that valve 54 should be placed at least 8 to 10 feet from the mix chamber, although the minimum distance required will vary depending on air pressure and line size.

In practice, the entire flushing cycle takes only a few seconds and uses only a small quantity of solvent, thereby causing a minimum of inconvenience and expense to the operator.

Flush-Warning System

A flush-warning system is incorporated in the apparatus to ensure that the operator will not forget to flush the chamber and mix tube if the dispensing gun remains inactive for a prolonged time interval. The flush-warning system is incorporated in the flush-warning module 64 and includes in the illustrated system an electrically operated timer 176 which can be preset to a desired timing period by the timer dial 65 on the front face of the module. An electrically operated flasher unit 178 is operatively connected to the timer and energized when the timer times out to cause the warning lamp 67 outside the module to blink and thus warn the operator that flushing or operation of the dispensing gun is necessary. Simultaneously warning bell 179 rings for the same purpose.

The electrical circuit for the timer also includes a manual on-off switch 180 operated from the front panel of the module, a pressure-actuated switch 182 which is normally closed when the apparatus is energized, and a solenoid-actuated valve 184 in the control air line 156 leading to the dispensing gun. Valve 184 is normally open when the system is energized.

Pressure switch 182 is operated by pressure in a catalyst pressure line 186 leading from an intersection with another catalyst pressure line 188 leading to catalyst pressure gauge 52. When there is excessive catalyst pressure in lines 188 and 186, indicating a restriction or stoppage in the system, pressure switch 182 opens to close solenoid valve 184, thereby rendering the entire dispensing system inoperable until the catalyst pressure is relieved.

A diaphragm separator 190 in catalyst pressure line 188 separates the actual catalyst which flows to the dispensing head from another more inert fluid used to measure the catalyst presure at gauge 52 and pressure switch 182. A similar diaphragm separator 192 is used for a similar purpose in a resin pressure line 194 leading from the outlet side of resin pump 30 to the resin pressure gauge 50.

Returning to the flush-warning module of FIG. 3, the timer circuit also includes a two-position timer actuator switch 196 which, in the position shown, energizes the timer to commence its timing cycle. In its other position, the switch resets the timer to the start of its timing cycle. The timer actuator switch is operated by an air actuator 198. Operation of the air actuator is controlled by an air-operated timer reset means indicated generally at 200. This means includes a manually operated timer reset valve 202 and an automatic timer reset means including the shuttle valve 203 and an air line 204 connected at 205 to a branch 158c of the pilot line 158 leading from the trigger-actuated air control of the dispensing gun.

The automatic timer sheet feature operates as follows: Each time trigger 82 is depressed, control air from line 156 passes into pilot line 158 and thus through the branch pilot air lines 158b and 158c to the reset air passage 204 in the warning module. Air passage 204 transmits air pressure through shuttle valve 203 into switch actuator 198 to move switch 196 to its reset position, thus resetting the timer to the beginning of its timing cycle. When trigger 82 is released, the timer begins timing out. If the trigger is not depressed again before the timer times out, warning lamp 76 blinks and warning bell 179 rings, warning the operator either to flush the system or to depress trigger 82 again to operate the dispensing gun.

The manual timer reset feature operates as follows: When the manual reset button 66 is depressed, air valve 202 permits air to pass from a branch 156a of control air line 156 through valve 202 and shuttle valve 203 to switch actuator 198 to move the switch to its timer reset position. Reset button 66 remains depressed until trigger 82 is depressed or button 66 is manually extended to restart the timing cycle.

Catalyst-Priming System

When the equipment is permitted to stand idle for a prolonged period of time, gas bubbles and impurities can collect in the catalyst pump and lines. These should be removed before the equipment is started to prevent airlock in the catalyst pump. It is necessary to build up the proper catalyst pressure prior to opeating the dispensing apparatus to ensure the proper ratio of catalyst to resin in the mixing chamber. Thus the dispensing apparatus is provided with a catalyst-priming system.

The priming system includes the catalyst supply bottle 40 mounted above the inlet of catalyst pump 36 so that catalyst can flow by gravity through catalyst feed line 41 from the bottom of the bottle to the catalyst pump inlet. The heart of the priming system that permits removal of air bubbles and impurities from the catalyst pump and lines is the catalyst dump bottle 42 mounted below catalyst supply bottle 40 and a manually operated catalyst purge valve 210 at the intersection of the primary catalyst supply line 98 and a catalyst dump line 212 leading to catalyst dump bottle 42.

Purge valve 210 is normally closed so that catalyst pumped by pump 36 flows through line 98, through four-way coupling 214 and directly to the dispensing head without any catalyst returning through purge valve 210 to dump bottle 42. However, when the purge valve actuator knob 210a is rotated, the purge valve opens, permitting catalyst to siphon through feed line 41, through catalyst pump 36 and through the open purge valve 210 to catalyst dump bottle 42, replacing the old catalyst in such components with fresh catalyst from the supply bottle and at the same time purging the pump and catalyst lines of any gas bubbles and impurities. When this has been done, the purge valve actuator knob 210a is rotated to reclose the purge valve.

With the catalyst circuit purged, it is necessary to build up catalyst pressure in line 98 before actuating the dispensing gun. To do this and thus prime the catalyst pump, a manually operated normally closed air valve 216 in an air bypass line 218 bypassing the normally closed air-operated pilot valve 160 is opened. This admits compressed air to the air motor 34 to start the motor and thus drive the catalyst and resin pumps without actuating the trigger 82 on the dispensing gun and thus without dispensing any material. At the same time, via common prime lever 220, a three-position resin valve 222 is moved to a position blocking flow from the outlet side of resin pump 30 to primary resin line 134 leading to the dispensing gun but admitting flow to a resin recirculation line 224 leading back to the inlet side of the resin pump. Thus by actuating priming lever 220, the air motor is started to drive both the resin and catalyst pumps without dispensing any resin while the necessary catalyst pressure is built up in the catalyst lines as detected by the catalyst pressure gauge 52.

After buildup of the necessary catalyst pressure, prime lever 220 is shifted, closing air bypass valve 216 to shut off air motor 34 and at the same time shifting resin valve 222 to a position blocking flow to the resin recirculation line 224 and opening flow to the primary resin supply line 134. The catalyst pump is now primed and the apparatus is ready for operation, assuming, of course, that the source of compressed air is open to communication with the various air passages and the described electrical circuitry is conditioned for operation by connecting the electrical plug 226 to a suitable electrical outlet.

Summary of Operation

In operating the equipment to dispense resin material into a desired void of a workpiece, the operator simply grips the dispensing gun in one hand, points the nozzle 78 at the void to be filled and presses trigger 82. He continues to press it until the desired amount of resin and catalyst mix is dispensed into the void. Then he releases the trigger to stop the dispensing action.

By depressing the trigger, control air line 156 is connected to pilot air line 158 and thus to its various pilot branches through the trigger-actuated air control 84. Thus simultaneously (1) pilot air admitted to the upper side of piston 142 in the dispensing gun retracts the piston and thus opens the resin and catalyst infeed ports in the dispensing head; (2) pilot air pressure acting through pilot air line 158b opens the pilot valve 160 in air supply line 162 leading to the air motor to start the motor and thus drive the catalyst and resin pumps simultaneously to meter catalyst and resin through their separate lines 98 and 134, respectively, to the dispensing head and through the now-open catalyst and resin infeed ports to the mixing chamber of the dispensing head and thence through the mix tube 76 and nozzle 78 to the work; and (3) pilot air acting through branch pilot line 158c and the automatic reset means of the flush-warning system operates the switch actuator 198 to move timer switch 196 in a direction for resetting timer 176.

When the trigger 82 is released, the communication between the control air line 156 and the pilot air line 158 and its various branches is blocked, permitting compression spring 152 in the dispensing head to push piston 142 and its connecting rod 144 in a direction to close the resin and catalyst infeed ports to the mixing chamber. At the same time, pilot air to pilot lines 158b and 158c is cut off, reclosing pilot valve 160 to shut off air motor 34 and thus stop the catalyst and resin metering pumps. Also at the same time, the flush-warning reset mechanism is depressurized to permit the timer 176 to begin time out. Release of trigger 82 also shifts air control 84 to place air control line 156 in communication with air line 154 leading into piston cavity 140 of the dispensing head on the spring side of the piston. This ensures that the movable valve members 148 and 146 are held in firm engagement against their respective catalyst and resin infeed ports, positively shutting off flow of the liquid components to the mixing chamber.

If the operator fails to depress trigger 82 to begin the dispensing cycle again for a prolonged period of time, timer 176 times out. When this occurs, warning light 67 blinks and warning bell 179 rings to alert the operator to the necessity of either depressing trigger 82 to dispense more material or actuating the flush system.

To actuate the flush system the operator simply turns the flush control valve 54, first briefly to its "solvent" position to insert a small charge of solvent into the downstream section of solvent line 138, and then to its "air" position to block flow from the solvent source into such line and at the same time to open the solvent line to high pressure air through line 170. The air pressure propels the solvent charge into the mixing chamber and there atomizes it and forces it from such chamber through the mix tube and nozzle to scrub these components of the system. The operator continues the air blast through the solvent line until the mixing chamber and mixing tube are completely purged of solvent and dried by the air blast. When this is done, the operator returns the flush valve 54 to its "off" position, blocking flow from both the solvent supply and the air pressure supply to solvent line 138.

In practice it has been found that a resin metering, mixing and dispensing system as described can be used for dispensing accutately very small or very large quantities of resin metering, mixing and dispensing system as described can be used for dispensing accurately very small or very large quantities of resin. Furthermore, the desired minute proportion of catalyst in the total liquid mix can be accurately varied anywhere within a range of from about ½% to 4% of the total volume of liquid dispensed. Once the desired percentage is determined and the pump linkage set accordingly, the percentage remains constant because of the common drive to the resin and catalyst pump.

A system as described has been successfully used to patch plywood panels using a fast polyester resin and a MEK peroxide catalyst, with the equipment being capable of dispensing material at the rate of from ½ to 4 pounds per minute.

Having illustrated and described what is presently a preferred embodiment of the invention, it should be apparent to those skilled in the art that the same permits of modification in arrangement and detail. We claim as our invention all such modifications as come within the true spirit and scope of the following claims.

We claim:

1. Apparatus for metering, mixing and dispensing two liquid components of a synthetic material, said apparatus comprising in combination:

dispensing means including means defining a mixing chamber for receiving said two liquid components, mixing tube means leading from said mixing chamber to a dispensing outlet opening, air-actuated valve means at entrances to said chamber for controlling the simultaneous admission of said two liquid components to said mixing chamber, and trigger-actuating means for controlling the simultaneous operation of said air-actuated valve means, a first metering means for metering a first of said two liquid components from a source of said first component to said mixing chamber, and first component passage means leading from the outlet side of said first metering means to said mixing chamber, a second metering means for metering the second of said two components from a second component source to said mixing chamber, and second component passage means leading from the outlet side of said second metering means to said mixing chamber, means including a source of air pressure for operating said first and second metering means, adjustment means for changing said metering ratio, first air passage means in communication with said air pressure source and leading to said first and second metering means, and normally closed air-operated valve-operated valve means in said first air passage means for controlling the operation of said metering means, trigger-operated air control means on said dispensing means operated by said trigger-actuating means, second air passage means in communication with said air pressure source and leading to said trigger-operated air control means, third air passage means extending from said triggering operated air control means to said normally closed air-operated valve means in said first air passage means and to said air-operated valve means of said dispensing means in a manner such that actuation of said trigger means simultaneously (1) opens said air-operated valve means in said first air passage means to operate said first and second metering means and (2) opens said air-operated valve means of said dispensing means to admit simultaneously said first and second liquid components from said first and second component passage means to said mixing chamber, a flush means comprising a source of liquid solvent, solvent passage means extending from said solvent source to said mixing chamber, fourth air passage means connected to said air pressure source and leading to said solvent source for forcing solvent into said solvent passage means, flush valve means in said solvent passage means at a position remote from said dispensing means, and a fifth air passage means connected to said air pressure source and to said solvent passage means at said flush valve means, said flush valve means being operable (1) in a first position to prevent both air flow and solvent flow through said solvent passage means to said mixing chamber, (2) in a second position to admit only a charge of solvent into said solvent passage means downstream of said flush valve means, and (3) in a third position to admit only pressurized air from said fifth air passage means into said solvent passage means and thereby propel said solvent charge into said mixing chamber.

2. Apparatus according to claim 1 including flush-warning means for indicating when said flush means should be operated including timer means, warning signal means operated by said timer means when said timer means times out, reset means for resetting said timer means, and means operably interconnecting said trigger-actuating means and said reset means to reset automatically said timer means upon each actuation of said trigger means.

3. Apparatus according to claim 2 wherein said reset means is air-pressure-operated and said means operably interconnecting said trigger means and said reset means includes said third air passage means.

4. Apparatus for metering, mixing and dispensing two liquid components of a synthetic material, said apparatus comprising in combination:

dispensing means including means defining a mixing chamber for receiving said two liquid components, mixing tube means leading from said mixing chamber to a dispensing outlet opening, air-actuated valve means for controlling the simultaneous admission of said two liquid components to said mixing chamber, and trigger-actuating means, a first metering pump means for pumping a first of said two liquid components from a source of said first component to said mixing chamber, and first component passage means leading from the outlet side of said first pump means to said mixing chamber, a second metering pump means for pumping the second of said two components from a second component source to said mixing chamber, and second component passage means leading from the outlet side of said second pump means to said mixing chamber, drive means for driving said first and second metering pump means, including a single air-operated motor means and mechanical drive transmission means interconnecting said motor means and said first and second pump means for driving both said pump means at a predetermined metering ratio, said mechanical drive transmission means including ratio adjustment means for changing said metering ratio, first air passage means in communication with air pressure source and leading to said air motor means, and normally closed air-operated valve means in said first air passage means for controlling the operation of said motor means, trigger-operated air control means of said dispensing means operated by said trigger-actuating means, second air passage means in communication with said air pressure source and leading to said trigger-operated air control means, third air passage means extending from said trigger-operated air control means to said normally closed air-operated valve means in said first air passage means and to said air-operated valve means of said dispensing means in a manner such that actuation of said trigger means simultaneously (1) opens said air-operated valve means in said first air passage means to operate said air motor means and (2) opens said air-operated valve means of said dispensing means to admit simultaneously said first and second liquid components from said first and second component passage means to said mixing chamber, said first component being a single-component liquid resin and said second component being a liquid catalyst, said first pump means comprising a resin pump, said second pump means comprising a catalyst pump, a catalyst supply means positioned above said catalyst pump for feeding catalyst by gravity to the inlet side of said pump, said first component passage means comprising a resin passage, said second component passage means comprising a catalyst passage, a catalyst dump means positioned below said catalyst supply means, and a purge passage leading from said purge valve means to said catalyst dump means, said purge valve when open being operable to siphon catalyst from said catalyst supply means through said catalyst pump and purge passage to said catalyst dump means to purge said catalyst pump and catalyst passage of entrapped gases and impurities.

5. Apparatus according to claim 4 including means for priming said catalyst pump, said priming meand comprising a bypass air passage bypassing said air-operated valve means in said first air passage means, a manually operated normally closed priming valve means in said bypass air passage for operating said air motor means when open, a resin recirculating passage for recirculating resin from the outlet to the inlet side of said resin pump, and manually operated recirculating valve means operable in a first position to close said resin passage and direct resin flow from said resin pump into said reciruclation passage and operable in a second position to close said recirculation passage and direct resin flow from said resin pump into said resin passage, whereby with said priming valve open and said recirculation valve in its said first position said air motor will operate said resin and catalyst pumps to build up catalyst pressure in said catalyst passage without dispensing any resin or catalyst.

6. In a liquid material-dispensing system including a dispensing means having manual dispenser-actuating means for operating said dispensing means to dispense said liquid material, and a flush means for flushing liquid material from said dispensing means including a manually operable flush-actuating means, a flush-warning means for warning an operator of said dispensing system when said system should be flushed, comprising timer means, warning signal means operated by said timer means when said timer means times out, air-operated timer-actuating means for commencing a timing cycle of said timer means, timer reset means operably connected to said timer-actuating means for resetting said timer means to the beginning of its timing cycle, reset-operating means operably interconnecting said dispenser-actuating means and said timer reset means in a manner such that said timer is reset upon each actuation of said dispenser-actuating means, said reset means being air operated and said reset-operating means including air passage means extending from said dispenser-actuating means to said reset means, said dispenser-actuating means being operable upon actuation to connect said air passage means to a source of air pressure sufficient to operate said reset means.

7. In a liquid-dispensing system wherein first and second liquid components are caused to flow through separate component passages to a common mixing chamber in a dispensing head for intermixing just prior to dispensing through a dispensing means, a flush system comprising:

a source of air pressure, a source of liquid solvent, solvent passage means extending from said solvent source to said mixing chamber, means including air pressure and a first air passage means extending from said air pressure source to said source of liquid solvent for inducing a flow of solvent from said source into said solvent passage means, second air passage means extending from said air pressure source to an intersection with said solvent passage means, and control valve means at said intersection operable (1) in a first position to prevent flow of both air and solvent through said solvent passage means toward said mixing chamber, (2) in a second position to admit a charge of solvent to the said solvent passage means between said valve means and said mixing chamber, and (3) in a third position to shut off flow from said solvent source and to admit air under pressure into said solvent passage means behind said solvent charge to propel said solvent charge into said mixing chamber under high pressure and there atomize said solvent and thereafter force the atomized solvent through said dispensing means to scrub said chamber and dispensing means, said control valve means being positioned in said solvent passage means at a point remotely upstream from said dispensing head, a flush warning means for warning an operator of said dispensing system when said system should be flushed including:

timer means, warning signal means operated by said timer means when said timer means times out, timer actuating means for commencing a timing cycle of said timer means, timer reset means operably connected to said timer actuating means for resetting said timer means to the beginning of its timing cycle, and reset operating means operably interconnecting said dispenser actuating means and said timer reset means in a manner such that said timer is reset upon each actuation of said dispenser actuating means.

* * * * *